(12) United States Patent
Humphries et al.

(10) Patent No.: US 7,975,905 B2
(45) Date of Patent: Jul. 12, 2011

(54) THERMAL CONTAINER

(75) Inventors: Gary W. Humphries, Dartmouth (CA); Alan W. McKinnon, Dartmouth (CA)

(73) Assignee: Fresh Bailiwick Inc., Dartmouth, Nova Scotia (CA)

( * ) Notice: Subject to any disclaimer, the term of this patent is extended or adjusted under 35 U.S.C. 154(b) by 210 days.

(21) Appl. No.: 12/170,870

(22) Filed: Jul. 10, 2008

(65) Prior Publication Data

US 2010/0006630 A1  Jan. 14, 2010

(51) Int. Cl.
  *B65D 81/38* (2006.01)
  *B65D 5/60* (2006.01)
(52) U.S. Cl. .......... 229/103.11; 220/592.2; 220/592.21; 220/592.26; 220/495.01
(58) Field of Classification Search ............. 229/103.11, 229/186; 220/592.2, 592.21, 592.26, 495.03, 220/495.01, 23.9; 428/73, 116, 118, 157, 428/172
See application file for complete search history.

(56) References Cited

U.S. PATENT DOCUMENTS

| | | | | |
|---|---|---|---|---|
| 1,691,178 A | * | 11/1928 | Beaman | 229/103.11 |
| 1,715,814 A | * | 6/1929 | Brown | 229/103.11 |
| 2,301,657 A | * | 11/1942 | Hlavaty | 220/592.2 |
| 2,523,145 A | * | 9/1950 | Robinson | 229/103.11 |
| 3,124,292 A | * | 3/1964 | Stegner | 229/103.11 |
| 3,160,307 A | * | 12/1964 | Morrison | 220/4.33 |
| 4,928,847 A | | 5/1990 | Hollander et al. | |
| 5,000,372 A | | 3/1991 | Hollander et al. | |
| 5,102,004 A | * | 4/1992 | Hollander et al. | 220/592.25 |
| 5,111,957 A | | 5/1992 | Hollander et al. | |
| 5,230,941 A | | 7/1993 | Hollander et al. | |
| 5,314,087 A | * | 5/1994 | Shea | 229/103.11 |
| 5,429,264 A | * | 7/1995 | Hollander et al. | 229/103.11 |
| 5,492,267 A | | 2/1996 | Hollinder et al. | |
| 7,140,773 B2 | * | 11/2006 | Becker et al. | 383/99 |

FOREIGN PATENT DOCUMENTS

| | | |
|---|---|---|
| CA | 985236 A1 | 3/1976 |
| CA | 2347777 A1 | 6/2000 |
| WO | WO-87/03558 A1 * | 6/1987 |

* cited by examiner

*Primary Examiner* — Gary E Elkins

(57) ABSTRACT

A thermal insulating liner for a container lid has a top sheet and a bottom sheet spaced by a core. The bottom sheet has an exterior metal foil layer. A side edge-to-side edge transverse cut line extends through the bottom sheet proximate each of two opposed ends of the liner. The liner has reduced thickness end margins extending between each said side edge-to-side edge transverse cut line and each of the opposed ends. A die to make the lid liner has a central well and, proximate each end of the die, an upward step to a land with an inside edge of the step having a ramp surface. A first cutting blade protrudes upwardly from the land and a second cutting blade protrudes upwardly above the land at each end of the die and above the level of the first cutting blade.

16 Claims, 8 Drawing Sheets

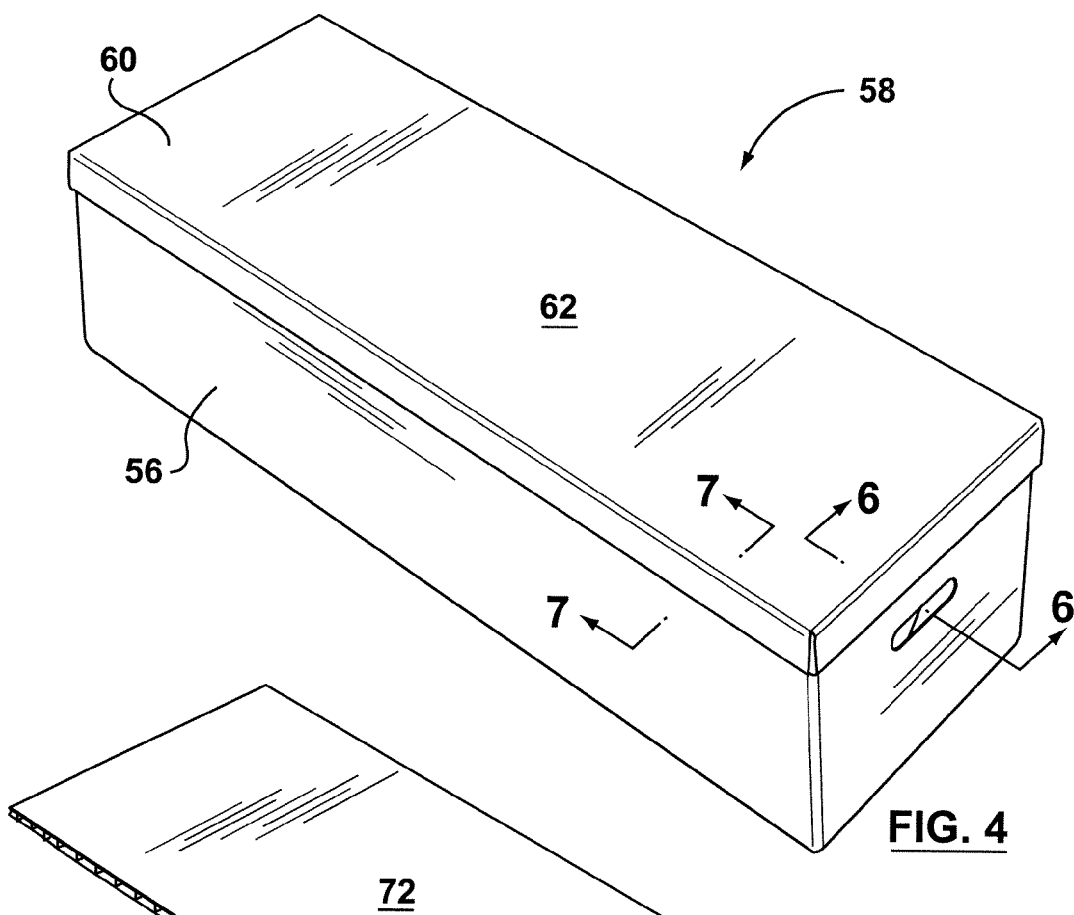
FIG. 4
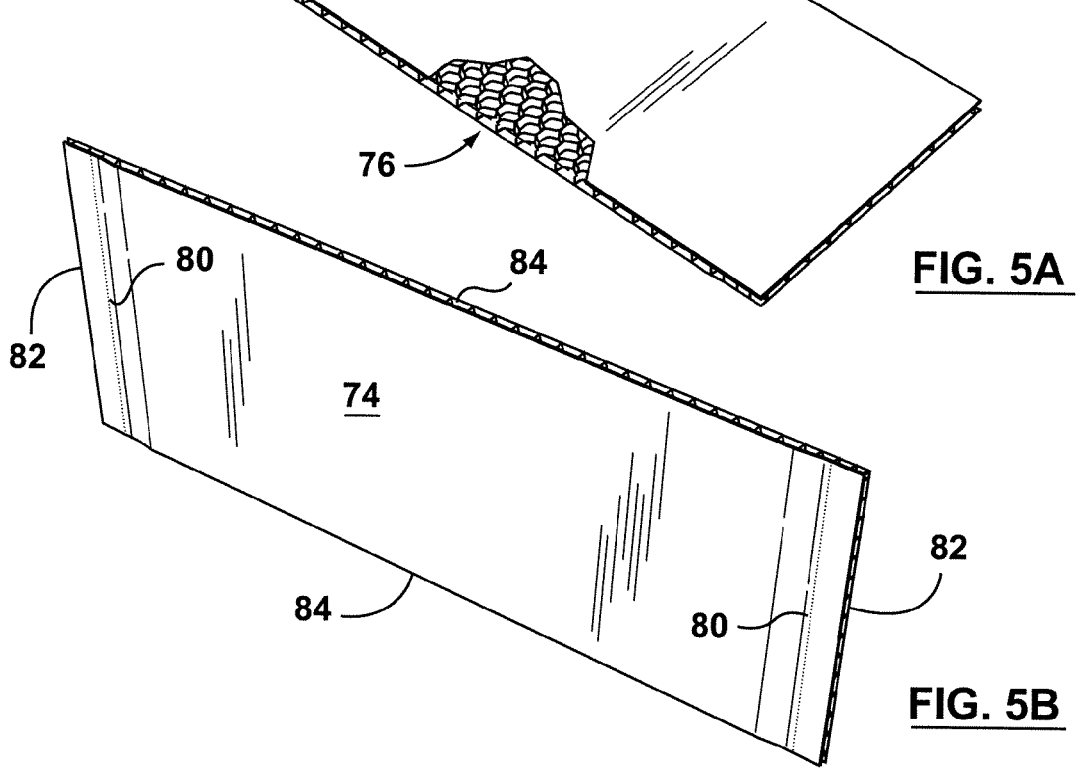
FIG. 5A
FIG. 5B

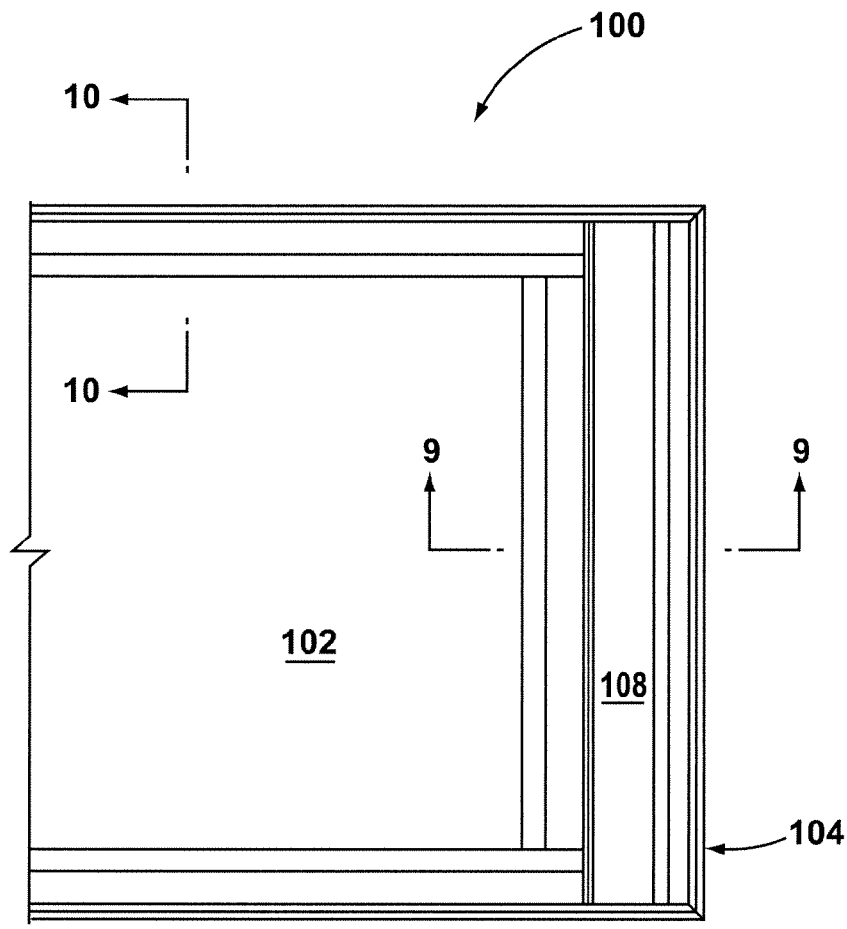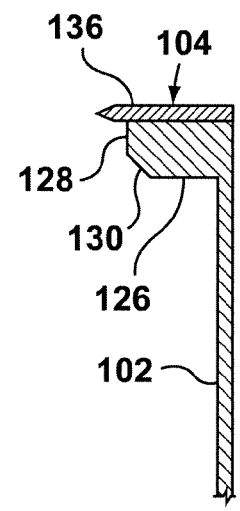
FIG. 8
FIG. 10
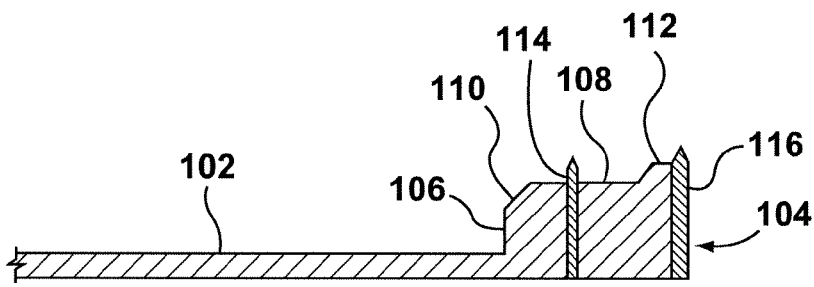
FIG. 9

THERMAL CONTAINER

BACKGROUND

This invention relates to a container, thermal insulating liners for a container, and dies for making thermal insulating liners.

Perishable goods may be packed in containers for shipping that utilize materials such as waxed corrugate and expanded foam. A refrigerant may be placed in the container with the goods. For example, it is known to pack fresh fish in a bag, surround the bag with a frozen Gel-Pack or ice, and place the bag and refrigerant in a corrugated container lined with polystyrene insulation. While such a thermally insulated container will keep the container contents acceptably refrigerated for a period of time, shipping times may exceed this time period. Further, the materials used for the containers, and especially expanded foam materials, give rise to environmental concerns.

U.S. Pat. Nos. 5,000,372 and 5,111,957 attempt to improve the insulating properties of a container by using panels formed of a honeycomb material covered by aluminum foil. However, there is a risk of leakage and there also remains a need for a thermal container which maintains its contents in a refrigerated state for a longer time period.

SUMMARY OF INVENTION

A thermal insulating liner for a container lid has a top sheet and a bottom sheet spaced by a core. The bottom sheet comprises a metal foil layer. A side edge-to-side edge transverse cut line extends through the bottom sheet proximate each of two opposed ends of the liner. The liner has reduced thickness end margins extending between each said side edge-to-side edge transverse cut line and each of the opposed ends.

In a container, the lid liner may be adhered to an inside of a lid. The container also has a further liner with an inner sheet and an outer sheet spaced by a core with the inner sheet comprising a metal foil layer. The further liner is folded into a container body.

A die to make the lid liner may have a central well and, proximate each end of the die, an upward step to a land with an inside edge of the step having a ramp surface. A first cutting blade protrudes upwardly from the land and a second cutting blade protrudes upwardly above the land at each end of the die and above the level of the first cutting blade.

A die to make the container body liner may have a central well, a circumferential cutting blade defining a generally rectangular shape and four generally square lands extending from each corner of the generally rectangular shape. A narrow land may extend along the cutting blade between each pair of corner lands with a ramp from the central well to each narrow land.

Other features and advantages of the invention will become apparent from the following description in conjunction with the drawings.

DRAWINGS

Figure 1A:
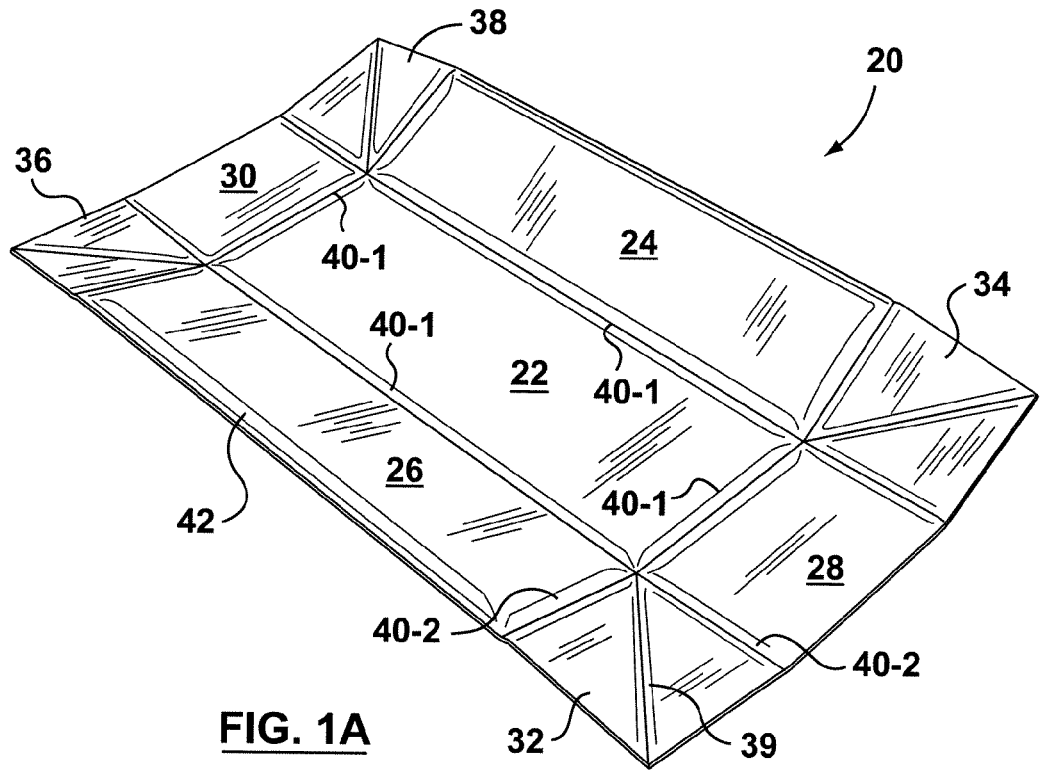
Figure 1B:
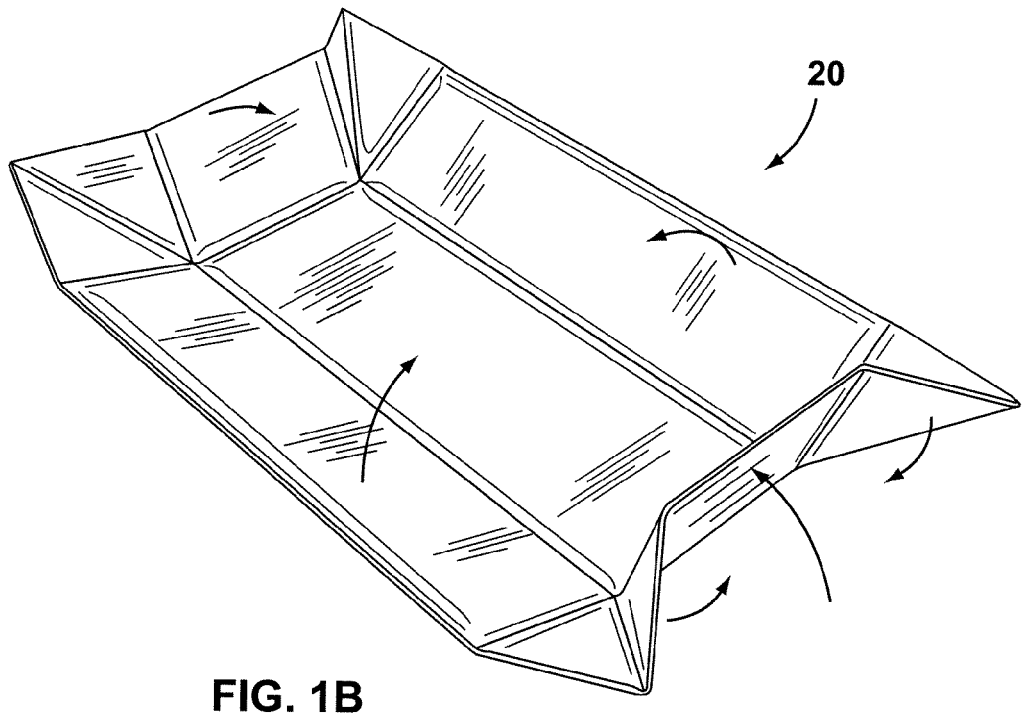
Figure 2:
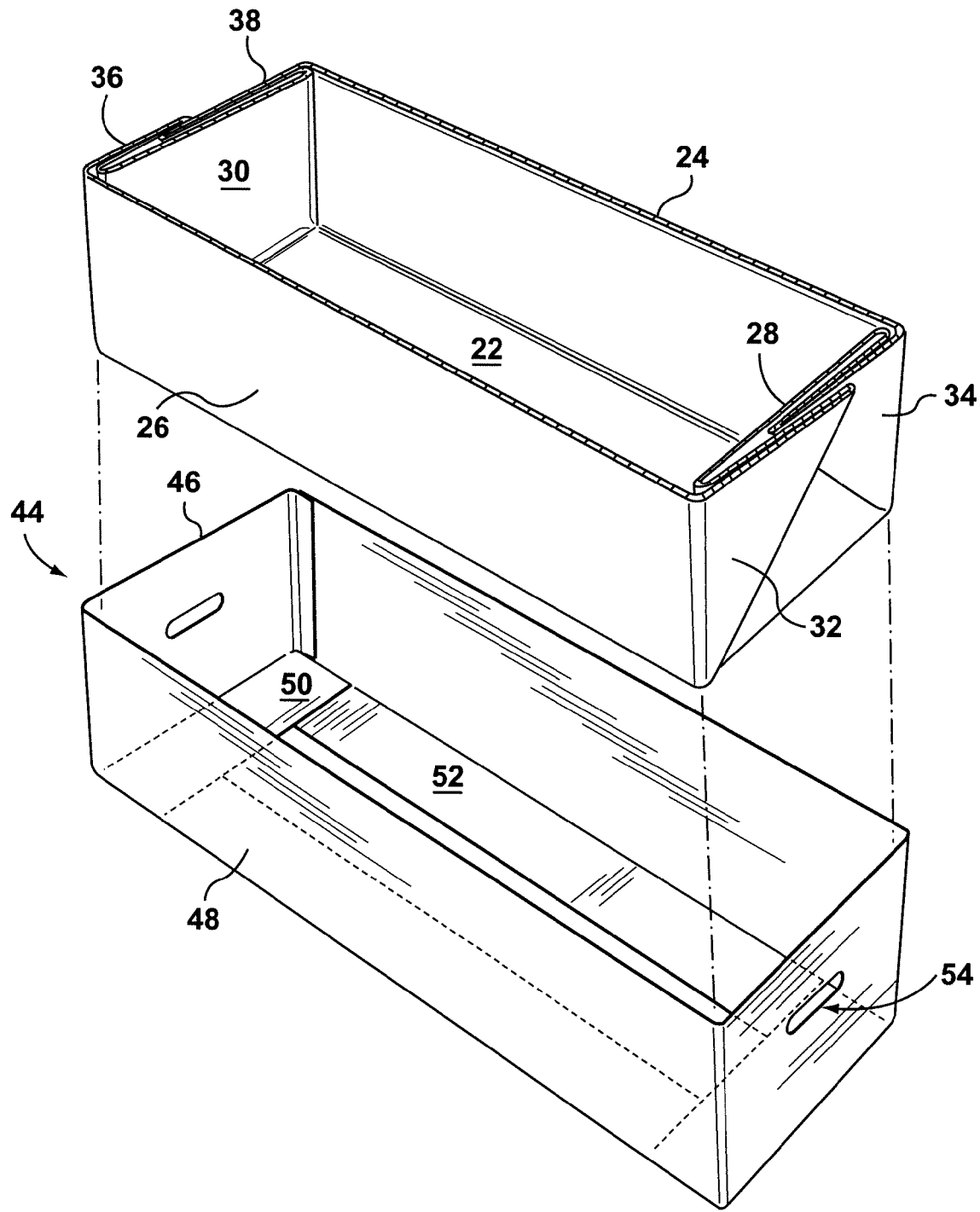
Figure 3:
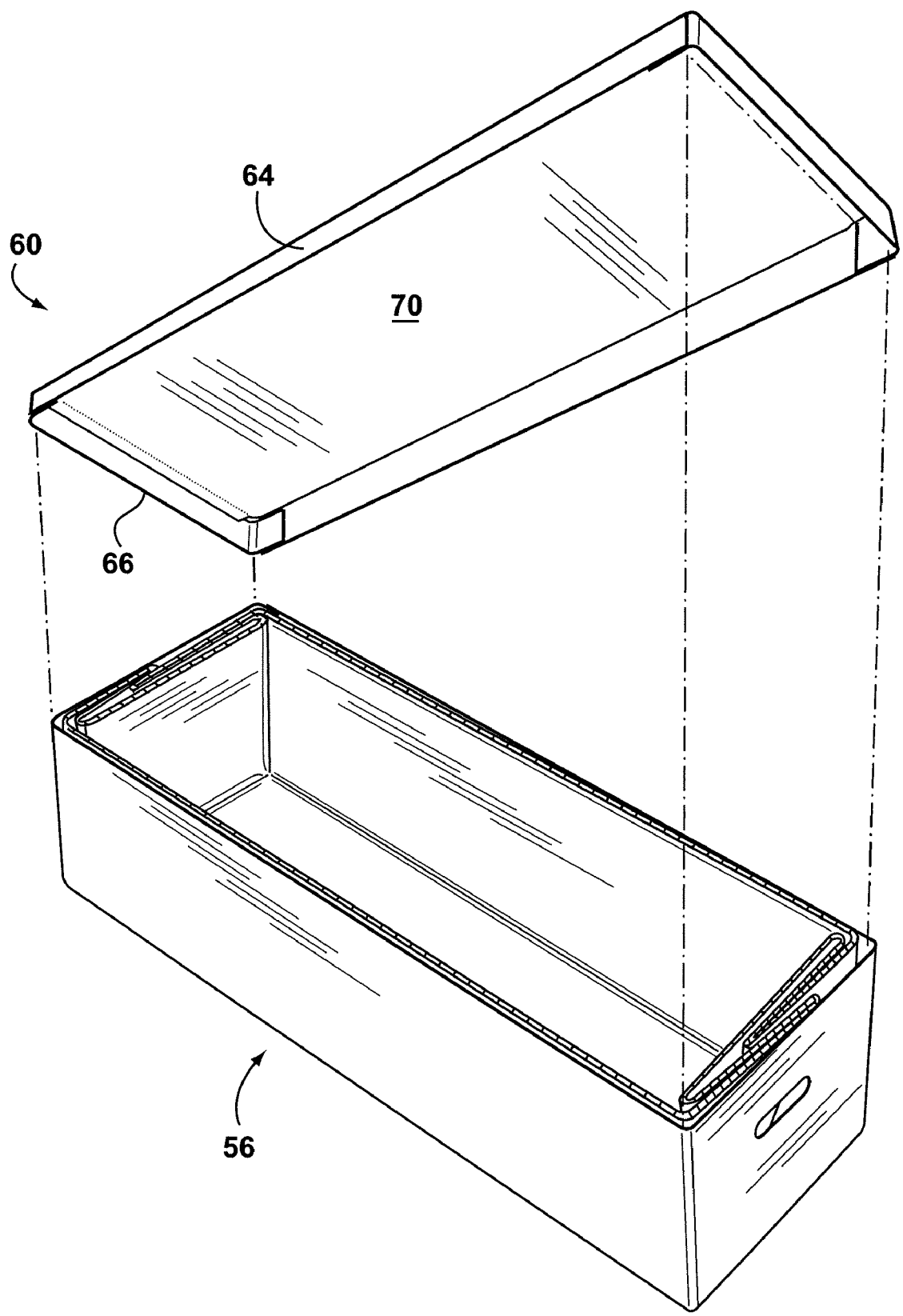
Figure 6:
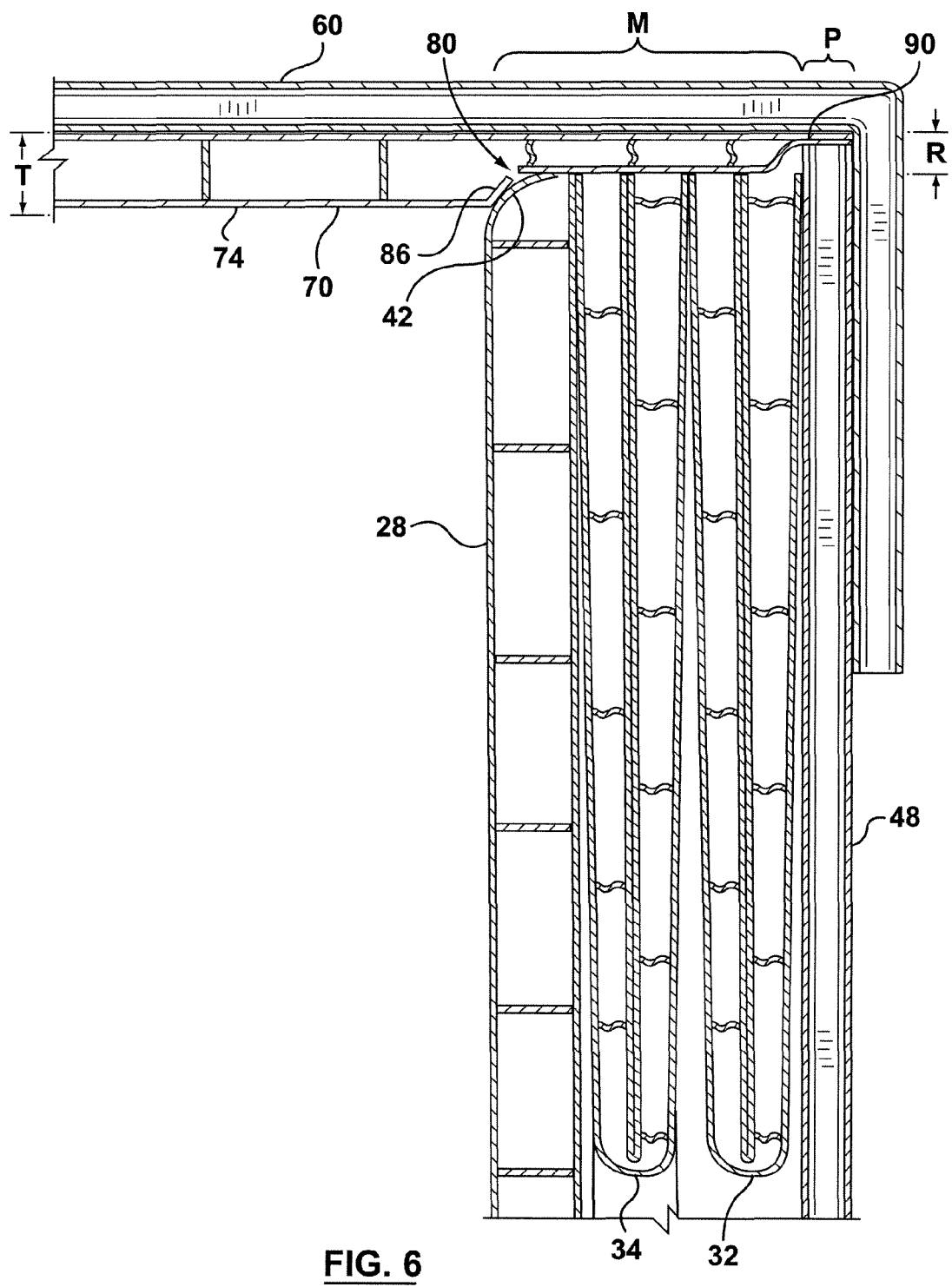
Figure 7:
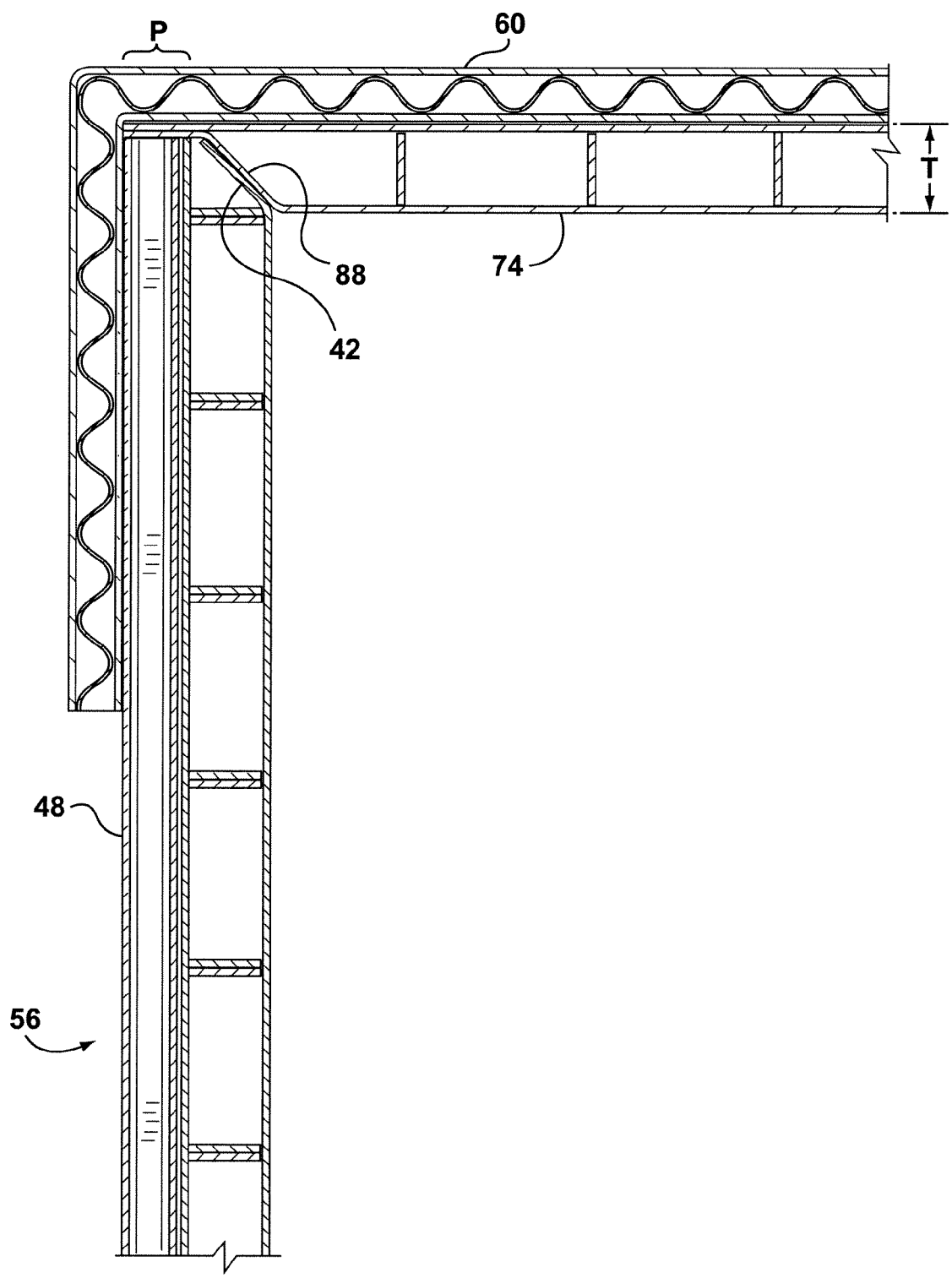
Figure 11:
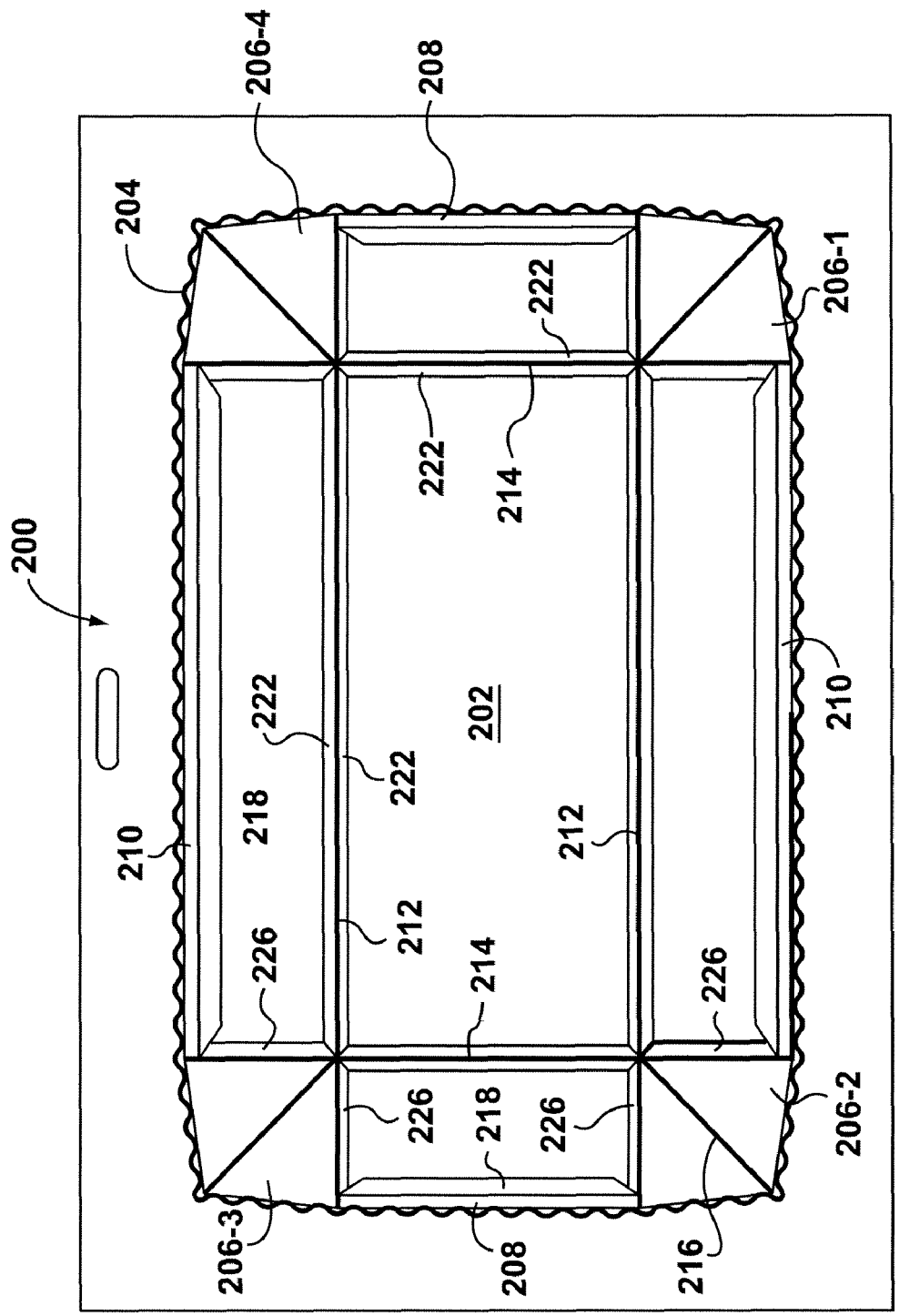

In the figures which illustrate an example embodiment of the invention,

FIGS. 1A and 1B are perspective views of a partially erected insulating liner for a container body made in accordance with this invention, FIG. 2 is an exploded view of a container body made in accordance with this invention, FIG. 3 is an exploded view of a container made in accordance with this invention, FIG. 4 is a perspective view of the container of FIG. 3 shown closed, FIGS. 5A and 5B are perspective views of a lid liner of the container of FIG. 3, FIG. 6 is a cross-sectional view along the lines 6-6 of FIG. 4, FIG. 7 is a cross-sectional view along the lines 7-7 of FIG. 4, FIG. 8 is a fragmentary top view of a die for fabricating the lid liner of FIGS. 5A and 5B, FIG. 9 is a cross-sectional view along the lines 9-9 of FIG. 8, FIG. 10 is a cross-sectional view along the lines 10-10 of FIG. 8, and FIG. 11 is a top view of a die for fabricating the container body liner of FIGS. 1A and 1B.

DETAILED DESCRIPTION

Turning to FIG. 1A, a partially erected insulating liner 20 has a bottom wall 22, side walls 24, 26, end walls 28, 30, and corner walls 32, 34, 36, 38. The walls are separated by crease lines 40-1 and 40-2. Additionally, score lines 39 bisect the corner walls. The crease lines 40-1 and 40-2 have a gentle slope to the centre of the crease line, but crease lines 40-1, which are between the bottom wall 22 and each of the side 24, 26 and end walls 28, 30, may have a modestly greater slope to the centre of the crease than do the remaining crease lines 40-2. The corner walls 32, 34, 36, 38 are compressed such that they have a reduced thickness as compared with the bottom wall 22. Additionally, the perimeter of the liner 20 along the side walls 24, 26 and along the end walls 28, 30 has a ramp surface 42 down to a reduced thickness edge.

FIGS. 1A, 1B, and 2 show the progressive erection of liner 20, with FIG. 1B illustrating the direction in which each wall is folded to erect the liner. As seen in FIG. 2, when erected, corner walls 32, 34 of liner 20 are folded behind end wall 28 and corner walls 36, 38 are folded behind end wall 30 such that the liner forms the shape of an open container body. This folding is facilitated by the fact that the corner walls have a reduced thickness and by crease lines 40-2 and score lines 39. Once the corner walls are folded back, this will tend to further compress the base of the corner walls, as is seen in FIG. 7. With continued reference to FIG. 2, when erected, the top edge of the side walls 24, 26 and end walls 28, 30 of the liner 20 have ramp surface 42. Also, because of the shape of the liner blank, the top edges of the corner walls lie below the top edge of the end walls 28, 30. Liner 20 may be slid into a base 44. The base 44 has a pair of end walls 46, a pair of side walls 48, and inwardly folded end flaps 50 underlain by inwardly folded side flaps 52. Each of the end walls has a cut out 54 to provide a hand grip.

Turning to FIGS. 3 and 4, once the erected liner 20 is slid into the base 44, the base holds the liner erect. The base 44, with the inserted liner 20, forms the body 56 of a container 58. Notably, the top edges of the side walls 26 and the end wall 28 of the erected liner 20 lie flush with, or slightly above, the top edges of the base whereas the corner walls lie flush with or below the top edges of the base. The lid 60 of the container has a top wall 62, a pair of narrow side walls 64 and a pair of narrow end walls 66. A thermal lid liner 70 is glued to the inside face of the top wall 62 of the lid. The base 44 and container lid (apart from thermal liner 70) may be fabricated of corrugate.

Referencing FIGS. 5A and 5B, the thermal lid liner 70 has a top sheet 72, a bottom sheet 74, and a core 76. The top and bottom sheets have an exterior metal foil layer laminated to an interior plastic substrate, such as a polypropylene, polyethylene or polyester substrate. The plastic substrate is glued to Kraft liner board paper. The core 76 is a series of Kraft paper walls between the top 72 and bottom 74 sheets forming honeycomb-shaped cells. The foil layer of the bottom sheet faces the interior of the container when the container is closed and therefore reflects cold back into the container. The foil layer of the top sheet faces the outside of the container when the container is closed and therefore reflects heat away from the container. The thermal liner 20 is constructed in the same manner as liner 70 such that liner 20 has an inwardly facing foil layer and an outwardly facing foil layer.

The thermal lid liner 70 has a transverse cut line 80 proximate each of its ends 82 extending from one side edge 84 to the other side edge 84 of the liner. This cut line extends through the bottom sheet 74 of the liner and may also extend part way through the core 76.

With reference to FIG. 6, the lid liner 70 has a thickness, T, at a middle portion of the liner and a reduced, thickness, R, in an end margin M extending between each side edge-to-side edge transverse cut line 80 and an adjacent end 82 of the liner. With reference to FIG. 7 along with FIG. 6, the lid liner 70 also has a reduced thickness band P about the perimeter of the lid liner, which perimeter band is thinner than the end margins M of the lid liner 70. As will be apparent from FIGS. 6 and 7, the top sheet 72 of the liner is generally planar and the bottom sheet 74 is generally planar except where the liner transitions in thickness. At the ends of the lid liner, the liner transitions in thickness from thickness T to reduced thickness R at a ramp surface 86 which is interrupted by cut line 80 and transitions from reduced thickness R to the further reduced thickness at the perimeter band P at a ramp surface 90. At the sides of the lid liner, the liner transitions from thickness T to the further reduced thickness at the perimeter band P of the liner at a ramp surface 88. The cut lines 80 assist in retaining the transition in thickness at end margins M and assist in allowing the mating of ramps 86 and 42.

The width of margin M along the ends of the liner substantially matches the thickness of the plural layers at the ends of the erected container body liner 20, and the width of the perimeter band substantially matches the thickness of the base 44. In consequence, with the container closed, the end margins M of the lid liner sit on the plural folded layers of the end of the container body liner with a ramp surface 86 of the lid liner abutting a ramp surface 42 of the container body liner and the perimeter band P of the lid liner sits on the top edges of the base 44. When closed, additionally, ramp surface 88 at each side of the lid liner abuts a ramp surface 42 at each side of the container body liner. When the lid 60 is in place, it may be pushed downwardly to further compress the lid liner and held in this position with strapping or the like. This forms a tight seal between the container body and lid thereby enhancing the thermal insulating properties of the container. Thus, the lid liner acts as a gasket providing a seal to the container body.

Lid liner 70 may be fabricated using the die illustrated in FIGS. 8 to 10. Turning to these figures, die 100 has a central well 102. Proximate each end 104 of the die, the die has an upward step 106 to an end land 108. An inside edge of this step has a ramp surface 110. A cutting blade 114 protrudes upwardly above the end land. The end land 108 has an upward land step to an upper level 112; a cutting blade 116 extends along the end 104 of the die at the upper level 112 of the end land and extends above the level of the cutting blade 114.

Proximate each side of the die, the die has an upward step 126 to a side land 128. An inside edge of the step 126 has a ramp surface 130. A cutting blade 136 extends along the side of the die and protrudes above the side land 128.

Each side land 128 is flush with the upper level 112 of the end lands 108 and has a similar width to the width of the upper level 112.

With reference to FIGS. 6 and 7, a liner 70 may be formed from a blank by placing the blank on the die with the bottom side 74 facing the die and then pressing the blank downwardly with a platen. This will form the cut lines 80 in the blank, cut the blank to size, and crush the end margins M and perimeter band P of the lid liner to their reduced thicknesses while forming the ramp surfaces 86, 88, and 90.

Container body liner 20 may be fabricated using the die of FIG. 11. Turning to this figure, die 200 has a central well 202 with a circumferential cutting blade 204 defining a generally rectangular shape. A generally square corner land 206-1, 206-2, 206-3, 206-4 extends from each corner of the generally rectangular shape and a narrow land 208, 210 extends along the cutting blade 204 between adjacent corner lands. End-to-end creasing ridges 212 extend along an inside side of corner lands 206-1, 206-2 and along an inside side of corner lands 206-3, 206-4. Side-to-side creasing ridges 214 extend along an inside side of corner lands 206-1, 206-4 and along an inside side of corner lands 206-2, 206-3. A diagonal scoring ridge 216 extends through each corner land between a corner of the generally rectangular shape and an intersection of the end-to-end and side-to-side creasing ridges. Ramps 218 extend upwardly to the narrow lands 208, 210. These ramps may have a 40° slope and will form ramps 42 (FIG. 1A) in a container body liner made on the die. Ramps 222 extend upwardly to end-to-end creasing ridges 212 between the side-to-side creasing ridges and upwardly to the side-to-side creasing ridges 214 between the end-to-end creasing ridges. These ramps 222 may have a 10° slope and will form, with the creasing ridges, creases 40-1 in the container body liner. Ramps 226 extend upwardly to the portion of the end-to-end creasing ridges 212 and side-to-side creasing ridges 214 which lie along the inside edges of the corner lands. These ramps 226 may have a 7° slope and will form, along with the creasing ridges, creases 40-2 in the container body liner. Scoring ridges 216 form the scores 39 in the container body liner.

By forming the container body by folding a single panel (liner 70), there are no seams for liquids to leak through. Further, by gently creasing the liner, the chances of compromising the integrity of the liner, and hence risking leaks, is reduced. Applying the foil layer to a plastic substrate has the additional advantage that their relatively high elasticity permits the die operations without losing their integrity and thereby risking leaks.

The honeycomb core in the thermal liners 20 and 70 enhance their thermal properties as the honeycomb structures provide insulating dead air spaces. This, in conjunction with the seal formed between the lid 60 and container body 56 results in a container with superior thermal performance. Indeed, it has been observed that the described container may maintain contents in a refrigerated state for upwards of sixty hours. Further, it will be appreciated that the container is formed of environmentally benign materials.

Many modifications within the spirit of the invention are possible. For example, it would be possible to utilize a core in the thermal liners 20, 70 other than the described honeycomb structures provided the core is crushable. Also, the sheets of the thermal liners could omit the Kraft liner board paper. It would also be possible to omit the plastic substrate, however, this could significantly reduce the leak resistance of the container. Further, sufficient thermal insulation may be possible if only the inner sheets of the liners comprise a foil layer.

Rather than placing a liner blank on one of the described dies and pressing the blank into the die, male and female dies could be used.

Other modifications will be apparent to those skilled in the art and, therefore, the invention is defined in the claims.

What is claimed is:

1. A thermal insulating liner, said liner comprising:
   a top sheet and a co-extensive bottom sheet spaced by a co-extensive core;
   said bottom sheet comprising a metal foil layer;
   said liner having a transverse line through said bottom sheet proximate each of two opposed ends of said liner;
   said liner having reduced thickness end margins extending between each said transverse line and each of said opposed ends;
   wherein said core is a series of walls extending between said top she and said bottom sheet forming honeycomb-shaped cells extending between said top sheet and said bottom sheet, said core being crushed at said reduced thickness end margins;
   further comprising a reduced thickness band extending along a perimeter of said liner, said reduced thickness band being thinner than said reduced thickness end margins.

2. The liner of claim 1 further comprising a ramp surface to each reduced thickness end margin.

3. The liner of claim 2 wherein said top sheet is generally planar and said bottom sheet is generally planar at a middle portion and is non-planar where said liner transitions in thickness.

4. The liner of claim 1 wherein said bottom sheet comprises a bottom sheet plastic substrate for said foil layer and a paper layer adhesively adhered to said plastic substrate, said foil layer being the bottommost layer and wherein said top sheet comprises an exterior top sheet foil layer, a top sheet plastic substrate for said top sheet foil layer and an interior paper layer adhesively adhered to said top sheet plastic substrate, said top sheet foil layer being the topmost layer.

5. A container comprising:
   a first thermal insulating liner and a second thermal insulating liner, each said liner having an inner sheet and an outer sheet spaced by a core, said inner sheet comprising a metal foil layer;
   said first liner folded into a container body;
   a lid;
   said second thermal insulating liner adhered to an inside of said lid;
   said second thermal insulating liner having a side edge-to-side edge transverse cut line through said inner sheet of said second thermal insulating liner proximate each of two opposed ends of said second liner and reduced thickness end margins extending between each said side edge-to-side edge transverse cut line and each of said opposed ends;
   said inner sheet of said first thermal liner and said inner sheet of said second thermal liner facing an inside of said container when said container is closed.

6. The container of claim 5 further comprising a base surrounding side and end faces of said container body and at least a portion of a bottom of said container body to retain said container body in a folded condition.

7. The container of claim 6 wherein said core is a series of walls extending between said inner sheet and said outer sheet forming honeycomb-shaped cells extending between said inner sheet and said outer sheet.

8. The container of claim 7 wherein said inner sheet comprises a plastic substrate for said foil layer and a paper layer adhesively adhered to said plastic substrate such that said foil layer faces an inside of said container when said container is closed.

9. The container of claim 8 wherein said outer sheet comprises a paper layer adhesively adhered to a plastic substrate for a foil layer.

10. The container of claim 5 wherein said first thermal insulating liner has crease lines to facilitate said folding.

11. The container of claim 10 wherein said first thermal insulating liner is folded such that there is a single layer of said first thermal insulating liner at opposed sides of said container base and at a bottom of said container base and plural layers of said first thermal insulating liner at opposed ends of said container base.

12. The container of claim 11 wherein said innermost layer of said plural layers of said first thermal insulating liner at each end of said container base is thicker than each other layer of said plural layers at said each end of said container base.

13. The container of claim 12 wherein, when said container is closed, each said side edge-to-side edge transverse cut line through said inner sheet of said second thermal insulating liner is adjacent a top edge of a said innermost layer of said plural layers of said first thermal insulating liner.

14. The container of claim 13 wherein said second liner has a reduced thickness band about a perimeter of said second liner, said reduced thickness band being thinner than said reduced thickness end margins.

15. The container of claim 14 wherein a top edge of said first liner at said opposed sides and at each said innermost layer of said plural layers has a ramp surface.

16. A thermal insulating liner, said liner comprising:
    a top sheet and a bottom sheet spaced by a core;
    said bottom sheet comprising a metal foil layer;
    said liner having a transverse line through said bottom sheet proximate each of two opposed ends of said liner;
    said liner having reduced thickness end margins extending between each said transverse line and each of said opposed ends;
    wherein said transverse line extends from one side edge to an opposite side edge of said bottom sheet and wherein said transverse line is a cut line.

* * * * *